(12) United States Patent  
Park et al.

(10) Patent No.: US 11,554,487 B2  
(45) Date of Patent: Jan. 17, 2023

(54) ROBOT NAVIGATING THROUGH WAYPOINTS BASED ON OBSTACLE AVOIDANCE AND METHOD OF ROBOT'S NAVIGATION

(71) Applicant: LG ELECTRONICS INC., Seoul (KR)

(72) Inventors: Joongtae Park, Seoul (KR); Hyoungrock Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 339 days.

(21) Appl. No.: 16/616,405

(22) PCT Filed: May 7, 2019

(86) PCT No.: PCT/KR2019/005431  
§ 371 (c)(1),  
(2) Date: Nov. 22, 2019

(87) PCT Pub. No.: WO2019/235743  
PCT Pub. Date: Dec. 12, 2019

(65) Prior Publication Data  
US 2021/0331315 A1  Oct. 28, 2021

(30) Foreign Application Priority Data  
Jun. 8, 2018 (KR) .......................... 10-2018-0066116

(51) Int. Cl.  
*B25J 9/16* (2006.01)  
*B25J 13/08* (2006.01)  
*B25J 19/02* (2006.01)

(52) U.S. Cl.  
CPC .......... *B25J 9/1666* (2013.01); *B25J 13/089* (2013.01); *B25J 19/02* (2013.01)

(58) Field of Classification Search  
CPC ...... B25J 9/1664; B25J 9/1697; B25J 9/1676; B25J 9/1666; B25J 19/02; G05D 1/00; G05D 1/02; G05B 19/18  
See application file for complete search history.

(56) References Cited

U.S. PATENT DOCUMENTS

2008/0027591 A1\* 1/2008 Lenser ................. G05D 1/0297  
701/28  
2010/0070078 A1   3/2010 Kong et al.  
(Continued)

FOREIGN PATENT DOCUMENTS

JP   H07311047 A  * 11/1995  
JP   20023212035     10/2002  
(Continued)

OTHER PUBLICATIONS

English Translation of KR20130111801 A, Accessed May 3, 2022 (Year: 2013).*

(Continued)

*Primary Examiner* — Jeff A Burke  
*Assistant Examiner* — Blake A Wood  
(74) *Attorney, Agent, or Firm* — Lee Hong Degerman Kang & Waimey

(57) ABSTRACT

Disclosed herein are a robot navigating based on obstacle avoidance and a navigation method. In the robot or the navigation method of the robot according to an embodiment, a navigation route may be generated on the basis of position information on a waypoint and on objects sensed by a sensor, such that the robot may move via one or more waypoints.

20 Claims, 12 Drawing Sheets

(56) References Cited

U.S. PATENT DOCUMENTS

| | | | |
|---|---|---|---|
| 2011/0035087 A1* | 2/2011 | Kim | G05D 1/0217 |
| | | | 701/25 |
| 2011/0137461 A1 | 6/2011 | Kong et al. | |
| 2012/0232738 A1 | 9/2012 | Jeon | |
| 2017/0028556 A1* | 2/2017 | Summer | B25J 9/1664 |
| 2017/0336800 A1* | 11/2017 | Chou | G05D 1/0212 |
| 2018/0095479 A1* | 4/2018 | Dong | H04W 4/02 |

FOREIGN PATENT DOCUMENTS

| | | | |
|---|---|---|---|
| KR | 20080029679 | | 4/2008 |
| KR | 1020100031878 | | 3/2010 |
| KR | 20100092807 | | 8/2010 |
| KR | 20110090702 | | 8/2011 |
| KR | 20130111801 A | * | 10/2013 |
| KR | 20160095472 | | 8/2016 |

OTHER PUBLICATIONS

English Translation of JPH07311047A, Accessed May 3, 2022 (Year: 1995).*
Korean Intellectual Property Office Application No. 10-2018-0066116, Notice of Allowance dated Feb. 27, 2020, 6 pages.

* cited by examiner

ROBOT NAVIGATING THROUGH WAYPOINTS BASED ON OBSTACLE AVOIDANCE AND METHOD OF ROBOT'S NAVIGATION

CROSS-REFERENCE TO RELATED APPLICATIONS

This application is the National Stage filing under 35 U.S.C. 371 of International Application No. PCT/KR2019/005431, filed on May 7, 2019, which claims the benefit of earlier filing date and right of priority to Korean Application No. 10-2018-0066116, filed on Jun. 8, 2018, the contents of which are all hereby incorporated by reference herein in their entirety.

TECHNICAL FIELD

The present disclosure relates to a robot navigating based on obstacle avoidance and a method of robot's navigation.

BACKGROUND

In order for a robot to operate in a space such as an airport, a school, a public office, a hotel, an office, a factory, a gym, a cultural facility including a venue for events, and the like where goods and services are actively exchanged, the robot is required to continuously sense the space and move in the space. Additionally, while navigating, the robot is required to avoid pedestrians or objects carried by the pedestrians in a space in which there are a plurality of pedestrians or objects.

Specifically, in a space where goods and services are actively exchanged, people may appear suddenly in different directions. In this case, the robot is also required to avoid objects carried by them. Methods for enabling a robot to keep a distance from movable obstacles and to avoid movable obstacles greatly affect a navigation path and a function of the robot. Additionally, movements of the robot to a specific point greatly affect performance of the robot while the robot is moving.

FIG. 1 shows a process in which a robot navigates on the basis of specific points to perform outdoor robot missions disclosed in U.S. Pat. No. 7,539,557. When the robot approaches to a waypoint within a certain radius of the waypoint during the navigation of the robot, it can be considered that the robot went through the waypoint. In this navigation process, only certain distance (threshold) is used for determining whether the robot has passed through the waypoint or not, so, the robot may not respond to pedestrians/objects and the like met by the robot while the robot is moving.

Accordingly, a method and an apparatus for generating a navigation path are described, such that a robot responds to movable obstacles and goes through a waypoint while the robot is moving.

DISCLOSURE

Technical Problems

The disclosure addresses the solution for the foregoing issues and provides a robot that is capable of setting a navigation route on the basis of characteristics of each waypoint and a navigation method when the robot identifies and avoids obstacles placed in a direction in which the robot is navigating.

According to the disclosure, there are also provided a robot to avoid obstacles and to pass through a waypoint more efficiently on the basis of two or more waypoints and on the basis of a position of the robot.

Also provided are a robot and navigating method of setting a navigation route such that the robot efficiently goes through a waypoint on the basis of characteristics of the waypoint while passing through the waypoint placed between a start point and a destination in response to an obstacle that is changed in real time.

The present disclosure is not limited to the foregoing objectives, but other objects and advantages will be readily appreciated and apparent from the following detailed description of embodiments of the present disclosure. It will also be appreciated that the objects and advantages of the present disclosure may be achieved by the means shown in the claims and combinations thereof.

Technical Solutions

In a robot or a method of robot's navigation according to an embodiment of the present disclosure, a navigation route may be generated on the basis of position information on a waypoint and on objects sensed by a sensor, such that the robot may move via one or more waypoints.

In a robot or a method of robot's navigation according to an embodiment of the present disclosure, when the robot may not approach to a first waypoint due to objects sensed by the sensor and placed near the first waypoint, and when the robot is positioned within a preset reference distance from the first waypoint, a navigation route may be generated such that the robot moves to a second waypoint after the first waypoint.

In a robot or a method of robot's navigation according to an embodiment of the present disclosure, a navigation route may be generated on the basis of the order of a plurality of waypoints and angles between the waypoints and the robot.

In a robot or a method of robot's navigation according to an embodiment of the present disclosure, a navigation route may be generated on the basis of effective area information on an effective area range, which is a criterion for determining whether the robot has passed through a waypoint or not and which is stored in a storage, such that the robot moves within an effective area range of a waypoint.

Advantageous Effects

According to embodiments of the present disclosure, a navigation route may be generated on the basis of characteristics of each waypoint when a robot navigates by identifying obstacles placed in a navigation direction in which the robot is moving and by avoiding the obstacles, thereby enhancing efficiency of navigation and reducing navigation hours.

Additionally, according to embodiments of the present disclosure, a robot may avoid obstacles and may pass through a waypoint more efficiently on the basis of two or more waypoints and on the basis of a position of the robot when the robot moves.

Further, according to embodiments of the present disclosure, a robot may optionally go through a waypoint on the basis of characteristics of the waypoint placed between a start point and a destination in response to an obstacle that is changed in real time, thereby generating a navigation route adequate for the robot to efficiently pass through the waypoint.

Effects of the present disclosure are not limited to the above-described ones, and one having ordinary skill in the art to which the disclosure pertains may easily draw various effects from the configuration of the disclosure.

DETAILED DESCRIPTION

Figure 1:
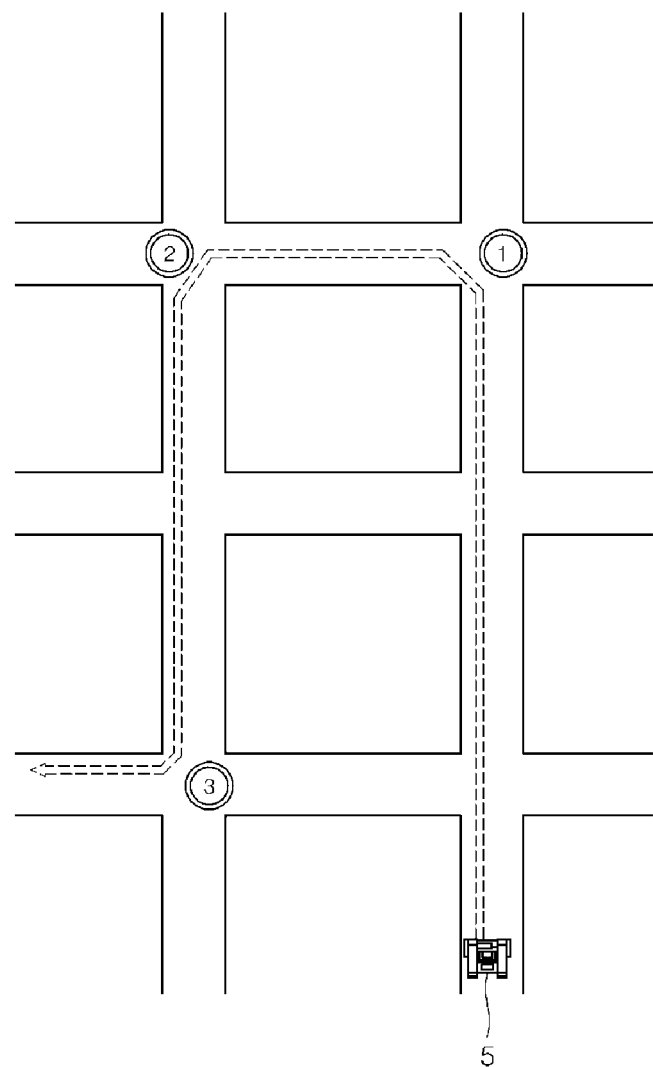
FIG. 1 shows a process in which a robot navigates on the basis of specific points to perform outdoor robot missions disclosed in U.S. Pat. No. 7,539,557.

Hereinafter, exemplary embodiments of the present disclosure will be described in detail with reference to the accompanying drawings such that the disclosure can be easily implemented by those skilled in the art. The present disclosure can be embodied in various forms and is not limited to the embodiments.

Parts which are not associated with description will be omitted in order to clearly describe the disclosure, and the same or similar elements over the entire specification will be referred to by the same reference signs. Some embodiments of the disclosure will be described in detail with reference to the accompanying drawings. In the drawings, the same elements will be referred to by as the same reference signs as possible. In the following description, when detailed description of the relevant known configurations or functions is determined to obscure the important point of the present disclosure, the detailed description will be omitted.

Terms such as first, second, A, B, (a), and (b) can be used to describe elements of the disclosure. These terms are merely used to distinguish one element from another element and the essence, order, sequence, number, or the like of the elements is not limited to the terms. If it is mentioned that an element is "coupled" or "connected" to another element, it should be understood that the element is directly coupled or connected to another element or still another element may "interposed" therebetween or the elements may be "coupled" or "connected" to each other with still another element interposed therebetween.

In embodying the disclosure, elements can be segmented and described for the purpose of convenience of explanation, these elements may be embodied in one device or module, or one element or may be divided and embodied into two or more devices or modules.

In this specification, a robot includes devices that are used for specific purposes (cleaning, security, monitoring, guiding and the like) or that moves offering functions according to characteristics of a space in which the robot moves, hereunder. Accordingly, in this specification, devices that have transportation means capable of moving using predetermined information and sensors, and that offer predetermined functions are generally referred to as a robot.

In this disclosure, a robot may move holding a map. The map denotes information on fixed objects such as fixed walls, fixed stairs and the like that do not move in a space. Additionally, information on movable obstacles that are disposed periodically, i.e., information on dynamic objects may be stored on the map. As an example, information on obstacles disposed within a certain range with respect to a direction in which the robot moves forward may also be stored on the map. In this case, unlike the map in which information on the above-described fixed objects is stored, the map may include information on obstacles, which is registered temporarily, and then the information may be removed after the robot moves.

Further, in this specification, the robot may confirm an external dynamic object using various sensors. When the robot navigates to a destination in an environment that is crowded with a large number of pedestrians after confirming the external dynamic object, the robot may confirm a state in which waypoints to the destination are occupied by obstacles. Furthermore, the robot may determine the robot smoothly arrives at a waypoint on the basis of a degree in a change of directions of the waypoint and may move to the next waypoint to successfully navigate to the destination.

Figure 2:
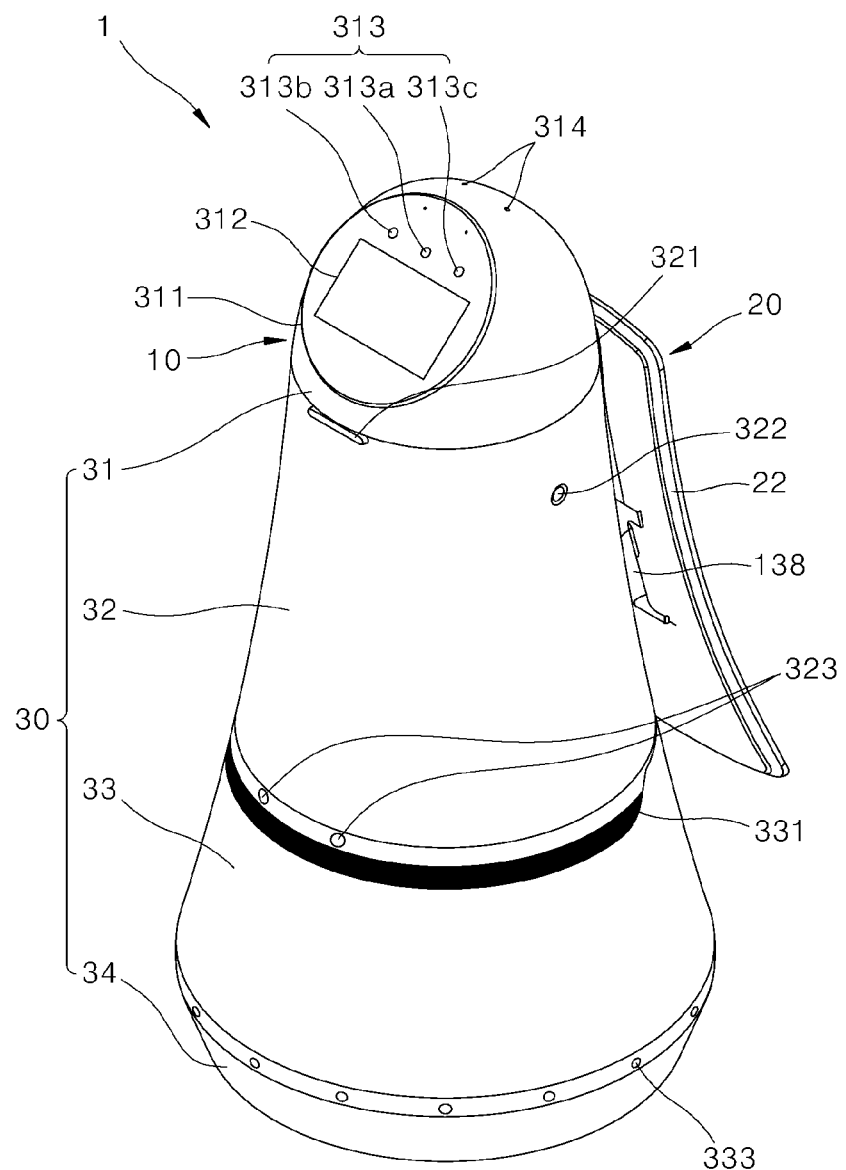
FIG. 2 shows an appearance of a robot according to an embodiment of the present disclosure.

FIG. 2 shows an appearance of a robot according to an embodiment of the present disclosure. FIG. 2 shows an exemplary appearance. The robot of the present disclosure may be implemented as robots having various appearances in addition to the appearance of FIG. 2. Specifically, each component may be disposed in different positions in the upward, downward, leftward, rightward, forward, rearward directions and the like on the basis of the shape of a robot.

A main body 10 may be configured to be long in the up-down direction, and may have the shape of a roly poly toy that gradually becomes slimmer from the lower portion toward the upper portion, as a whole.

The main body 10 may include a case 30 that forms the appearance of the robot 1. The case 30 may include a top cover 31 disposed on the upper side of the case 30, a first middle cover 32 disposed on the lower side of the top cover 31, a second middle cover 33 disposed on the lower side of the first middle cover 32, and a bottom cover 34 disposed on the lower side of the second middle cover 33. The first middle cover 32 and the second middle cover 33 may constitute a single middle cover.

The top cover 31 may be disposed at the uppermost end of the robot 1, and may have the shape of a hemisphere or a dome. The top cover 31 may be disposed at a height below the average height for adults to readily receive an instruction from a user. Additionally, the top cover 31 may be configured to rotate at a predetermined angle.

The top cover 31 and a head unit inside the top cover 31 that are disposed at the uppermost end of the robot 1 and that have a shape and function similar to the head of a person may interact with a user. Accordingly, the top cover 31 and the head unit inside the top cover 31 may be referred to as a head. Additionally, the rest portion disposed on the lower side of the head may be referred to as a body.

The top cover 31 may include an operation unit 311 on one side of the front surface of the top cover 31. The operation unit 311 may receive an instruction input by a user. To this end, the operation unit 311 may include a display 312 for receiving a touch input by a user.

Below, the display 312 disposed in the operation unit 311 is referred to as a head display 312, a display unit 20 disposed in the body is referred to as a body display unit 20. The body display unit 20 may include a support unit 22 and may be fixed in the main body 10 by an additional fixation member 138.

The head display 312 may be configured as a touch screen by forming a mutual layer structure with a touch pad. In this case, the head display 312 may be used as an output device and as an input device in which information may be input by a touch of a user.

Additionally, the operation unit 311 may face upward at a certain angle such that a user may easily operate the head display 312 looking down at the head display 312. For example, the operation unit 311 may be disposed on a surface formed by cutting a portion of the top cover 31. Accordingly, the head display 312 may be inclined disposed.

Further, the operation unit 311 may have a circular or an oval appearance, as a whole. The operation unit 311 may be implemented as a shape similar to the shape of a person's face.

As an example, the operation unit 311 have a circular shape, and one or more structures for displaying a person's eyes, nose, mouth, eyebrows and the like may be disposed on the operation unit 311.

That is, a specific structure may be disposed on the operation unit 311 to display a person's eyes, nose, mouth, eyebrows and the like, or the operation unit 311 may be painted. Accordingly, the operation unit 311 may provide emotional comfort to a user because the operation unit 311 has the shape of a person's face. Further, when a robot with the shape of a person's face navigates, a user may feel the robot looks like a person. Thus, feelings of disapproval may be reduced.

As another example, one or more images for showing a person's eyes, nose, mouth, eyebrows and the like may be displayed on the head display 312.

That is, various images for showing the shape of a person's face as well as information concerning path-guiding services may be displayed on the head display 312. Additionally, images for showing designated facial expressions at regular intervals or at a specific time may also be displayed on the head display 312.

With respect to FIG. 2, a direction in which the operation unit 311 faces is defined as a "forward direction". Additionally, a direction opposite to the "forward direction" is defined as a "rearward direction".

The operation unit 311 may be provided with a head camera unit 313 for recognizing a person and an object.

The head camera unit 313 may be disposed on the upper side of the head display 312. The head camera unit 313 may include a 2D camera 313a, and an RGBD sensor 313b, 313c.

The 2D camera 313a may be a sensor for recognizing a person or an object on the basis of 2D images.

Additionally, the RGBD (Red, Green, Blue, Distance) sensor 313b, 313c may be a sensor for acquiring a position of a person or an image of a face. The RGBD sensor 313b, 313c may be a sensor for detecting a person or an object using captured images having depth data acquired from a camera having RGBD sensors, or a similar 3D image device.

A plurality of RGBD sensors 313b, 313c may be provided to detect a position of a person or an image of a face accurately. As an example, two RGBD sensors 313b, 313c may be provided and may be disposed respectively on the left side and the right side of the 2D camera 313a.

Though not illustrated, the operation unit 311 may further include a physical button to directly receive an instruction input by a user.

Additionally, the top cover 31 may further include a microphone 314.

The microphone 314 may receive an instruction of audio signals input by a user. As an example, four microphones 314 may be formed in any points in the upper end portion of the top cover 31 to receive a voice instruction from a user accurately. Accordingly, while the robot 1 is navigating or the top cover 31 is rotating, the microphone may receive a voice requesting guiding services from a user accurately.

In an embodiment, the top cover 31 may rotate such that the operation unit 311 faces a navigation direction while the robot 1 is navigating. Additionally, when the robot 1 receives an instruction (e.g., voice instructions and the like) from a user while navigating, the top cover 31 may rotates such that the operation unit 311 faces a direction in which a user is positioned.

Further, when the robot 1 receives an instruction from a user while navigating, the top cover 31 may rotate in a direction opposite to the navigation direction of the robot 1. That is, the top cover 31 may rotate in a direction in which the body display unit 20 faces. Accordingly, a user may effectively operate the operation unit 311 while looking at information on path-guiding services and the like, which is displayed on the body display unit 20.

The first middle cover 32 may include an RGBD sensor 321.

The RGBD sensor 321 may perform the function of sensing a collision between the robot 1 and an obstacle while the robot 1 is navigating. To this end, the RGBD sensor 321 may be placed in a direction in which the robot 1 navigates, i.e., at the front of the first middle cover 32. As an example, the RGBD sensor 321 may be placed in the upper end portion of the first middle cover 32 considering the height of an obstacle or a person positioned in the forward direction of the robot 1. However, the position of the RGBD sensor 321 is not limited. The RGBD sensor 321 may be disposed in various positions in front of the first middle cover 32.

According to embodiments, the first middle cover 32 may not be provided with the RGBD sensor 321, and functions of the RGBD sensor 321 may be performed by the head camera unit 313.

Additionally, the first middle cover 32 may further include a hole 322 for a speaker.

The hole 322 for a speaker may be a hole for delivering a sound generated by a speaker outward. The hole 322 for a speaker may be formed on the outer circumferential surface of the first middle cover 32, and a single hole for a speaker may be formed. On the other hand, a plurality of holes 322 for a speaker, spaced apart from each other, may be formed on the outer circumferential surface of the first middle cover 32.

The first middle cover 32 may further include a hole 323 for a stereo camera.

The hole 323 for a stereo camera may be a hole for operating a stereo camera (not illustrated) installed inside the main body 10. As an example, the hole 323 for a stereo camera may be formed at the lower end of the first middle cover 32 in the forward direction thereof. Accordingly, the stereo camera may photograph a forward area of the robot 1 through the hole 323 for a stereo camera.

The second middle cover 33 may include a first cut-out portion 331.

The first cut-out portion 331 may be formed from the forward direction to the lateral direction of the outer circumferential surface of the second middle cover 33. The first cut-out portion 331 is a cut-out portion of the second middle cover 33 such that a forward LiDAR sensor (not illustrated) may operate.

Specifically, the first cut-out portion 331 of a certain length may be radially cut on the outer circumferential surface of the second middle cover 33 in the forward direction thereof. The forward LiDAR is placed inside the second middle cover 33. The first cut-out portion 331 may be cut and formed along the circumference of the second middle cover 33 on the outer circumferential surface of the second middle cover 33, corresponding to the position of the forward LiDAR. That is, the first cut-out portion 331 and the forward LiDAR may face each other. Accordingly, the forward LiDAR may be exposed outward by the first cut-out portion 331.

As an example, the first cut-out portion 331 may be cut at an angle of 270 degrees along the circumference of the second middle cover 33 from the forward direction thereof. A laser emitted from the forward LiDAR may be prevented from directly radiating into the eyes of an adult or a child because the first cut-out portion 331 is formed in the second middle cover 33.

The shape of the robot in FIG. 2 is provided as an example, and the present disclosure is not limited to the shape. Additionally, various cameras and sensors of the robot may also be disposed in various portions of the robot 1.

Figure 3:
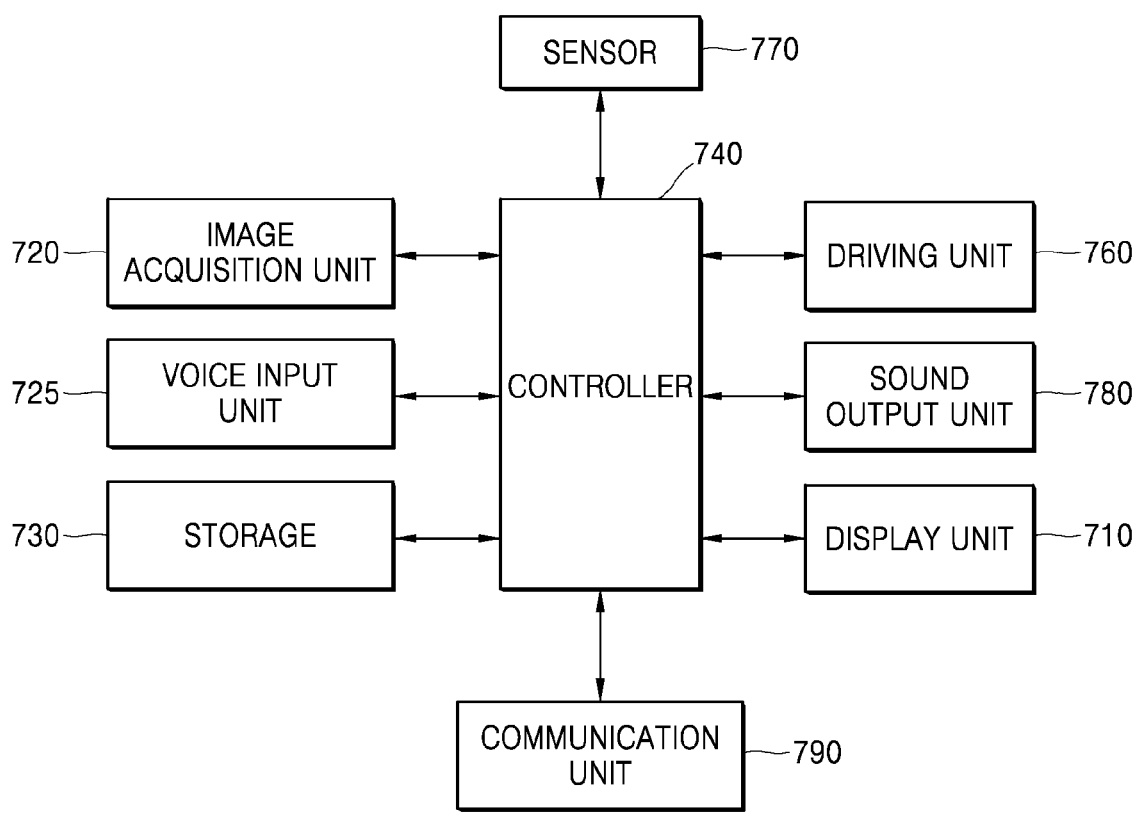
FIG. 3 shows a block diagram of a control relation between main components of a robot according to an embodiment of the present disclosure.

FIG. 3 shows a block diagram of a control relation between main components of a robot according to an embodiment of the present disclosure.

A robot 1 according to an embodiment may include a voice input unit 725 receiving an input voice of a user through a microphone 314, an image acquisition unit 720, a storage 730 storing various data, a communication unit 790 transmitting data to and receiving data from another electronic device such as a server (not illustrated) and the like, and a controller 740 controlling operations of the robot 1 as a whole.

The voice input unit 725 may include or connect to a processing unit converting analog sounds into digital data, and may digitize a voice signal input by a user such that the voice signal may be recognized by the controller 740 or a server (not illustrated).

The controller 740 may control operations of the robot 1 as a whole by controlling the voice input unit 725, the storage 730 and the communication unit 790 and the like that constitute the robot 1.

The storage 730 that records various pieces of information required for controlling the robot 1 may include a volatile recording medium or a non-volatile recording medium. A recording medium that stores microprocessor-readable data may include a hard disk drive (HDD), a solid state disk (SSD), a silicon disk drive (SDD), ROM, RAM, CD-ROM, magnetic tape, a floppy disk, an optical data storage device, and the like.

Additionally, the storage 730 may store carious types of data required for the robot 1 to offer guide services.

Further, the storage 730 stores position information on waypoints through which the robot is required to pass while the robot is moving. Furthermore, the storage 730 stores information on a weight for each waypoint or on a distance which is between the robot and a waypoint when the robot makes its closest approach to the waypoint and which is used to determine the robot passed through the waypoint, or on how close the robot moved to a waypoint or on how far the robot moved away from a waypoint in the past, and the like.

The controller 740 may transmit an operation state of the robot 1 or user input and the like to a server and the like through the communication unit 790.

The communication unit 790 includes at least one communication module and allows the robot 1 to connect with the internet or a predetermined network.

The storage 730 may store data for recognizing a voice, and the controller 740 may process a user's input voice signal received through the voice input unit 725 and may perform the process of recognizing a voice.

The controller 740 may control the robot 1 such that the robot 1 performs predetermined operations on the basis of results of voice recognition. Additionally, the controller 740 may control components according to characteristics of a space in which the robot is placed.

For example, in the case of a robot placed in an airport, the controller 740 may control the display unit 710 such that the display unit 710 may display predetermined information such as information on flight departure, information on tourism, and the like when an instruction included in a voice signal is an instruction for requesting the predetermined information such as information on flight departure, information on tourism, and the like.

Additionally, in the case of a robot placed in a hospital, the controller 740 may control the display unit 710 such that the display unit 710 may display predetermined information such as information on the location of a hospital ward, information on a location to be visited by a speaker according to processes in a hospital, and the like when an instruction included in a voice signal is an instruction for requesting the predetermined information such as information on the location of a hospital ward, information on a location to be visited, and the like.

According to a request made by a user for guide services, the controller 740 may control the robot such that the robot may escort the user to a destination selected by the user.

The process of recognizing a voice may be performed by a server not by the robot 1 itself.

In this case, the controller 740 may control the communication unit 790 such that a user's input voice signal may be transmitted to the server, and may receive results of recognition of the voice signal from the server through the communication unit 790.

Additionally, the robot 1 may perform a simple function of voice recognition such as call ward recognition and the like, and a server disposed outside the robot 1 may perform a high level of voice recognition such as natural language processing and the like. In this case, the robot 1 may transmit an input voice file to the server by controlling the communication unit 790, and the communication unit 790 may receive results of voice recognition from the server.

The robot 1 may include a display unit 710 displaying predetermined information as an image and a sound output unit 780 outputting predetermined information as sounds.

The display unit 710 may display information corresponding to a user's input request, processing results corresponding to a user's input request, operation modes, operation states, error states and the like, as images.

Further, the robot 1 may include a sensor 770 including sensors sensing various types of data concerning operations and states of the robot 1.

The sensor 770 may include an obstacle sensor sensing obstacles, and the obstacle sensor may include an infrared sensor, an ultrasonic sensor, an RF sensor, a geomagnetic sensor, a position sensitive device (PSD) sensor and the like. For example, the obstacle sensor may include an ultrasonic sensor 333, an RGBD sensor 321 and the like. The RGBD sensor 321 may offer the function of depth sensing.

Additionally, the sensor 770 may further include a cliff sensor sensing whether there is a cliff in a navigation area.

Further, the sensor 770 may include a LiDAR sensor.

The LiDAR sensor may detect an object such as an obstacle and the like on the basis of time of flight (TOF) of transmitted and received signals, or on the basis of a phase difference of transmitted and received signals using laser light as a medium.

Additionally, the LiDAR sensor may detect a distance to the object, a relative speed with the object, and the position of an object.

The LiDAR sensor may be provided as part of the configuration of the obstacle sensor. Further, the LiDAR sensor may be provided as a sensor for making a map.

The obstacle sensor senses an object, specifically an obstacle, placed in a direction in which the robot is navigating (moving), and delivers information on the obstacle to the controller 740. In this case, the controller 740 may control movements of the robot 1 according to the position of the sensed obstacle.

The sensor 770 may further include an operation sensor sensing operations of the robot 1 and outputting operation information according to driving of the main body 101. For example, the operation sensor may include a gyro sensor, a wheel sensor, an acceleration sensor and the like.

The gyro sensor senses a direction of rotation and detects an angle of rotation when the robot 1 moves according to a driving mode. The gyro sensor detects angular velocity of the robot 1, and outputs voltage values proportional to the angular velocity. The controller 740 outputs a direction of rotation and an angle of rotation using the voltage values output by the gyro sensor.

The wheel sensor connects to the left wheel and the right wheel, and senses frequencies of rotation of the wheels. The wheel sensor may be a rotary encoder. The rotary encoder senses and outputs frequencies of rotation of the left wheel and the right wheel.

The controller 740 may calculate rotational speed of the left and right wheels using frequencies of rotation. Additionally, the controller 740 may calculate an angle of rotation using a difference in frequencies of rotation of the left wheel and the right wheel.

The acceleration sensor senses changes in the robot 1 according to changes in speed of the robot 1, e.g., a start, a halt, a change in directions, a collision with an object and the like. The acceleration sensor may be attached to a position adjacent to a main wheel or a secondary wheel, and may detect wheel slips or idle rotations.

Additionally, the acceleration sensor may be built into the controller 740, and may sense changes in speed of the robot 1. That is, the acceleration sensor detects impulse according to a change in speeds, and outputs a voltage value corresponding to the impulse. Accordingly, the acceleration sensor may perform the function of an electronic bumper.

The controller 740 may calculate a change in the position of the robot 1 on the basis of operation information output by the operation sensor. The position is a relative position with respect to an absolute position using image information. The robot may enhance performance of recognizing a position using the image information and obstacle information by recognizing the relative position.

In the configuration of FIG. 3, the storage 730, the controller 740, and the sensor 770 may constitute a control device controlling the robot by constituting a single processor. In this case, the control device may be separated from the robot 1, and may be detachably mounted onto the robot 1.

Figure 4:
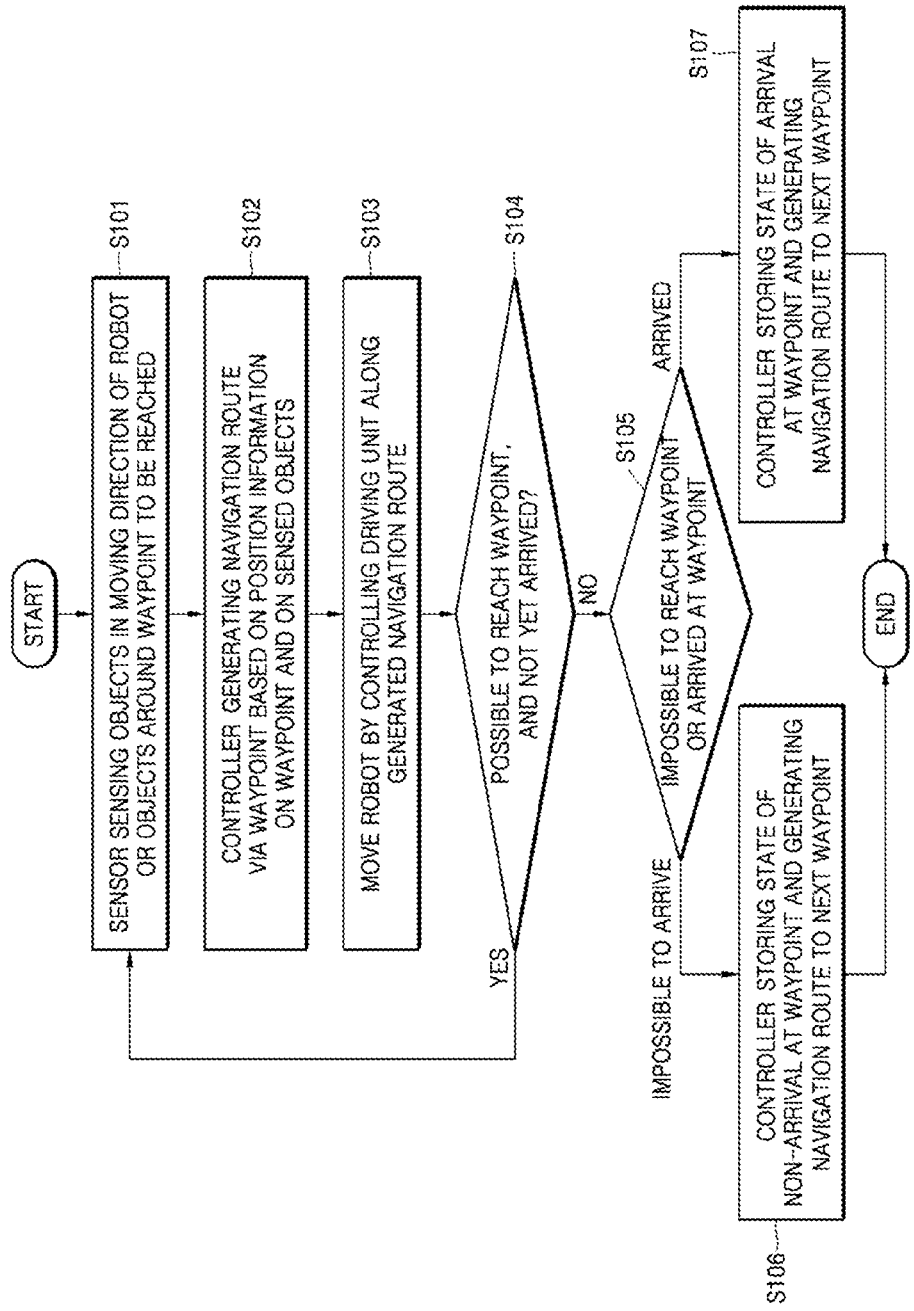
FIG. 4 shows a process in which a robot according to an embodiment of the present disclosure moves on the basis of information on one or more waypoints.

FIG. 4 shows a process in which a robot according to an embodiment of the present disclosure moves on the basis of information on one or more waypoints. FIG. 4 is described together with FIG. 3. The storage 730 stores position information on waypoints, and the sensor 770 senses objects disposed in a direction in which the robot moves, or objects around the waypoints that will be reached by the robot (S101). The controller 740 generates a navigation route that runs via the waypoints using the position information on waypoints and position information on sensed objects (S102).

Then the controller 740 moves the robot by controlling a driving unit 760 along the generated navigation route (S103). While the robot is moving, the controller confirms whether the robot can reach the waypoint (the possibility of reaching the waypoint), and confirms the state in which the robot has reached the waypoint, at regular intervals. The controller confirms whether the robot can reach the waypoint and that the robot has not yet reached the waypoint (S104).

When the controller confirms that the robot can reach the waypoint but has not yet reached the waypoint as a result of confirmation, the controller returns to step 101, senses position information on obstacles changed while the robot is moving, and re-generate a navigation route (S101~S103).

When confirming that the robot has not yet reached the waypoint as a result of confirmation, e.g., when the navigation route of the robot is totally blocked by obstacles, or the waypoint that will be reached by the robot is surrounded by obstacles according to information sensed by the sensor 770, the controller determines that the robot may not reach the waypoint, stores information on the state of non-arrival at the waypoint, and generates a navigation route to the next waypoint (S106). The obstacles may move all the time. Accordingly, the controller may determine the robot cannot reach the waypoint when the robot is close to the waypoint to some degree. For example, the controller may generate a navigation route in a way that avoids obstacles by determining arrival before the robot reached the waypoint within a one meter or two meter in straight line distance to the waypoint. Additionally, the controller may determine the robot cannot reach the waypoint on the basis of a below-described distance information, angle information and the like.

When the robot has reached the waypoint as a result of confirmation in step 105, the controller 740 stores information on the state in which the robot has reached the waypoint, and then generates a navigation route to the next waypoint (S107).

In a large-scale environment such as an airport, a hotel, a school, a hospital, a shopping mall and the like, a path has to be planned such that the robot may arrive at a destination without colliding with obstacles. However, in a wide space, the robot may not recognize previously all obstacles placed to a destination, and memory inside the robot is limited. Accordingly, it might be impossible to plan all paths specifically and previously.

Accordingly, as illustrated in FIG. 4, a waypoint, through which the robot is required pass to arrive at a destination, may be stored in the storage 730, and the robot may move while continuously changing a detailed plan for a path considering the position of a sensed (recognized) obstacle between waypoints.

Figure 5:
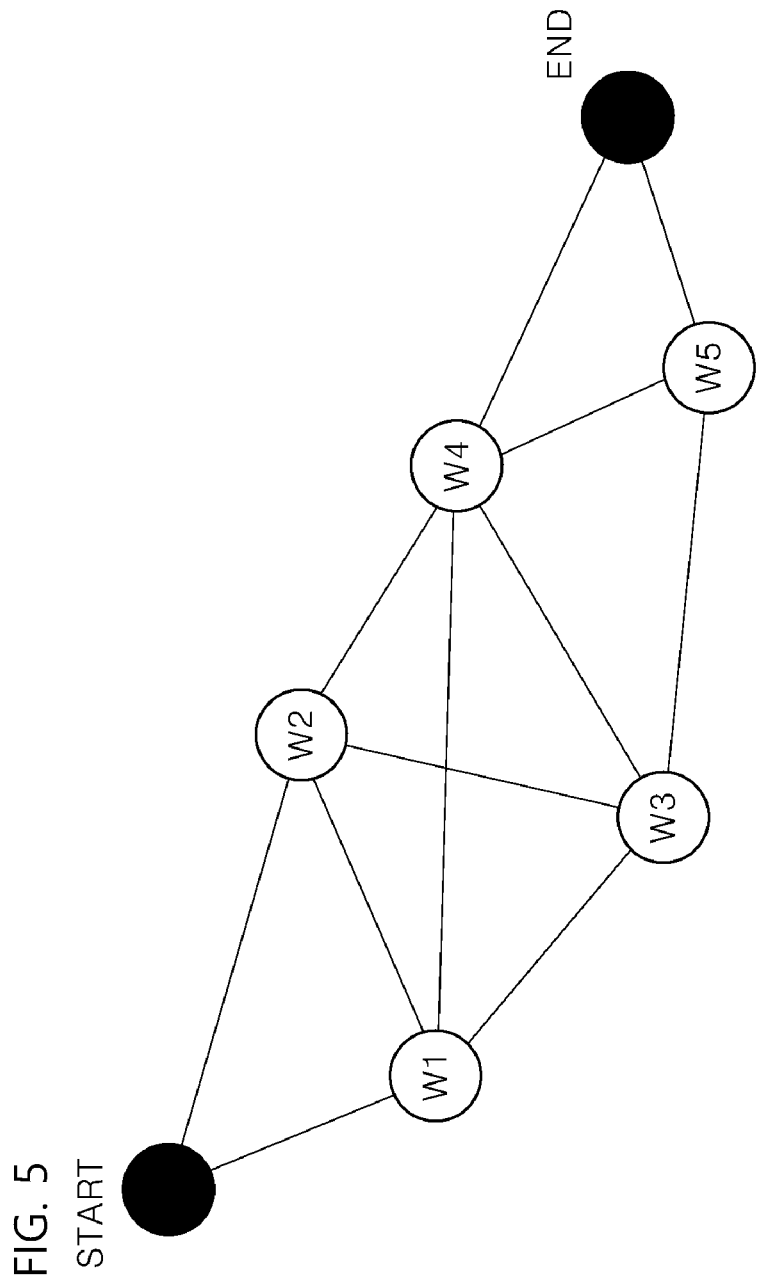
FIG. 5 shows points, stored in a storage of a robot according to an embodiment of the present disclosure, are schematized in a space.

FIG. 5 shows points, stored in a storage of a robot according to an embodiment of the present disclosure, are schematized in a space.

The robot goes through W1, W2, W3, W4, and W5 while moving from a start point (START) to a destination point (END). The waypoints may be classified as essential waypoints and non-essential waypoints, and the essential waypoints and non-essential waypoints may be stored in the storage 730. That is, information on waypoints, which is stored in the storage 730, includes information on essential/non-essential waypoints as well as position information. Priority may be given to each of the essential/non-essential waypoints.

Additionally, a radius used to determine whether the robot passed through each waypoint may be set. For example, when the robot approaches to all the waypoints within a distance less than a certain distance (e.g., 1 m) from the waypoints, it may be determined that the robot passed through the waypoints, or an effective area range for each waypoint may be set and stored in the storage 730 as effective area information.

Table 1 shows a configuration of a database in which information on waypoints is stored according to an embodiment. Priority and effective area information may be optionally included.

TABLE 1

| IDENTIFICATION INFORMATION | POSITION (X, Y) | PRIORITY | EFFECTIVE AREA INFORMATION (R_w) |
|---|---|---|---|
| START | (0, 150) | 1 | 0.5 |
| END | (250, 50) | 1 | 0.5 |
| W1 | (35, 105) | 2 | 1 |
| W2 | (100, 125) | 3 | 5 |
| W3 | (85, 25) | 2 | 2 |
| W4 | (170, 95) | 4 | 7 |
| W5 | (200, 0) | 2 | 3 |

As shown in Table 1, position information on each point, priority that is given to each point when the robot goes through and reaches each point, a point that is used to determine the robot has passed through or reaches each point, a maximum distance (effective area information) of the robot may be stored in the storage 730.

On the basis of the information, the robot may determine how to navigate along a path that is previously planned in a current environment crowded with pedestrians, and may arrive at a destination successfully.

That is, in FIG. 4, the controller 740 generates a navigation route including a second waypoint (e.g., W3) that will be reached by the robot after a first waypoint (e.g., W2) and then moves to W2. Herein, the controller 740 confirms that an object sensed by the sensor 770 is disposed near the first waypoint. When determining that the robot may not approach to the first waypoint, the controller 740 may subdivide step 106, and when a distance between the current position of the robot (coordinate information, an index on a map and the like), and a coordinate of the first waypoint is within a preset reference distance, the controller 740 may generate a navigation route such that the robot may move to the second waypoint.

When the controller confirms that the robot may not approach to the first waypoint, but a distance between the current position of the robot and the coordinate of the first waypoint is longer than the preset reference distance, the robot may search for a path with no obstacle between the first waypoint and the robot while moving around the first waypoint, or when the second waypoint, through which the robot passes next, takes higher priority over the first waypoint, the controller may store the state of non-arrival at the first waypoint, and may generate a navigation route to the second waypoint (S106).

Further, considering the situation of an error in the robot's recognizing a position, a dynamic obstacle near a waypoint, or an obstacle that was not previously confirmed by the robot, and the like, when the robot reaches a point within a range of certain distances (effective area range) from a waypoint the controller may determine that the robot has arrived, and may allow the robot to move to the next waypoint. An effective area range may be defined in various ways such as meter or an additional unit and the like.

Further, when a range of waypoints (effective area range) is fixed, the robot may wander around a waypoint in the case in which there are lots of obstacles in the effective area range. Furthermore, when an effective area range is too wide, the robot is highly likely to navigate away from a waypoint. Accordingly, the above-describe effective area range may be changed while the robot is navigating. Additionally, the robot may choose to move to the next waypoint on the basis of the current position of the robot and the location of the waypoint.

Figure 6:
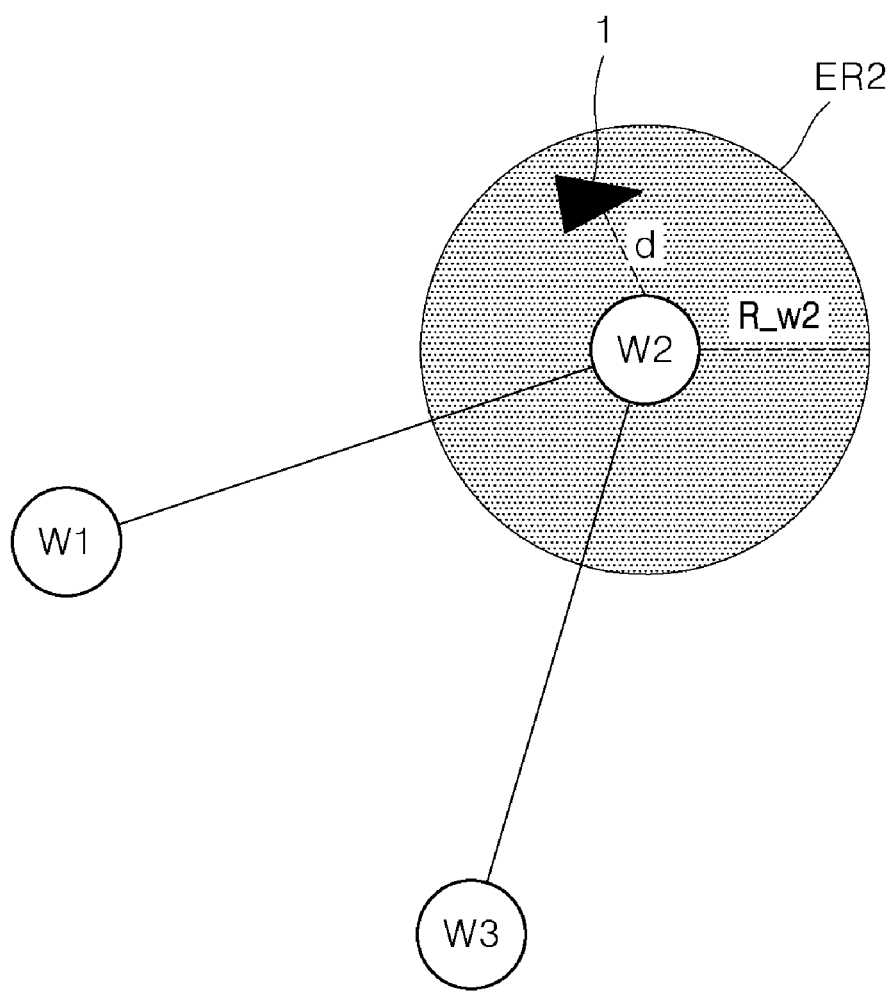
FIG. 6 shows a navigation path changed on the basis of a distance between a robot according to an embodiment of the present disclosure and a waypoint.

FIG. 6 shows a navigation path changed on the basis of a distance between a robot according to an embodiment of the present disclosure and a waypoint.

FIG. 6 shows a process in which when the robot makes its entry into a range of certain distances from a current target waypoint W2 through which the robot intends to pass, the robot may select the next waypoint W3 as a destination and may navigate to the waypoint W3.

As an example, in a dynamic environment, a shortest distance required to the robot in each waypoint, an effective area information, may be additionally set for the way point, which is not a final destination, or the shortest distances required to the robot to all the waypoints may be previously set for all the waypoints.

In FIG. 6, the robot 1 moves to W2 via waypoint W1, and reaches a point within a range of distances (R_w2) set on the basis of the effective area information indicating an effective area range set for W2 (ER2). R_w2 denotes a maximum radius set on the basis of the effective area information for W2.

In this case, applying the various environmental conditions such as an obstacle that is disposed when the robot 1 goes through W2, or time not enough for the robot 1 to go through W2, or priority not given to W2, and the like, and when a distance (d) between the robot 1 and W2 is within a R_w2 range, i.e., when the robot 1 arrives near W2 (within ER2), the controller 740 may determine that the robot 1 went through W2 and may set a navigation path to W3.

That is, a degree to which the robot 1 is required to approach may vary from waypoint to waypoint, or the robot may not be required to reach each waypoint exactly. Accordingly, when the robot may not approach to a waypoint (W2) due to an obstacle around the waypoint (W2), a distance (d) between the current position of the robot and the coordinate of the waypoint (W2) is calculated, and when the distance is within a pre-determined distance (R_w2), it may be determined that the robot has arrived at the destination. Additionally, the robot 1 may select the next waypoint W3 as a destination, may plan a detailed path and may navigate to the destination.

The embodiment of FIG. 6 may be used as a standard for which the controller 740 determines whether the robot passed through a waypoint using effective area information on an effective area range stored in the storage 730, as in FIG. 1. As a result, the controller may generate the navigation route on the basis of effective area information on a waypoint such that the robot may move within the effective area range.

Figure 7:
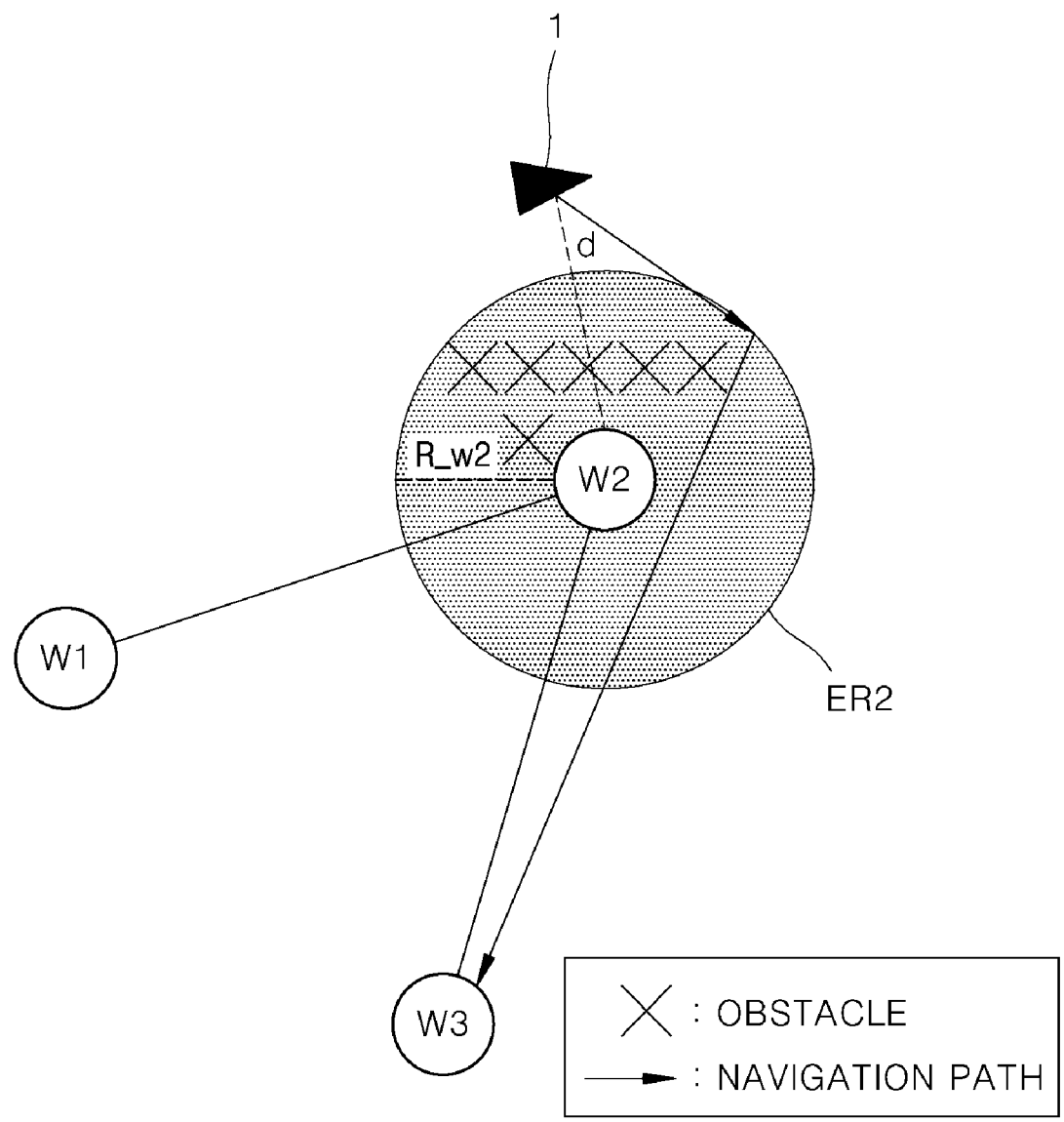
FIG. 7 shows a navigation path changed on the basis of a distance between a robot according to an embodiment of the present disclosure and a waypoint.

FIG. 7 shows a navigation path changed on the basis of a distance between a robot according to an embodiment of the present disclosure and a waypoint.

In FIG. 7, a distance (d) between the robot 1 and waypoint W2 is longer than a distance in effective area information (R_w2) on the effective area range (ER2) for waypoint W2. Additionally, there are a plurality of obstacles between W2 and the robot 1. Accordingly, the controller 740 generates a navigation path as illustrated in FIG. 7, the navigation route is necessary for the robot 1 for entering an effective area for W2 while avoiding the obstacles, and at the same time, also necessary for the robot 1 moving to the next waypoint W3. If the priority of W2 is very high and the priority of W3 is low, the robot 1 enters the effective area range for W2 while moving around W2.

That is, FIG. 7 shows that the robot generates a navigation path to W3 while entering an effective area ER2 for waypoint W2 because a distance (d) between the robot 1 and waypoint W2 is longer than a distance in effective area information (R_w2).

Additionally, the controller 740 may store information on a position to which the robol made its closest approach from waypoint W2 or information on a distance between the robot and W2 in the storage 730. Accordingly, when the robot moves far away from waypoint W2 during the next navigation, the robot may move closer to W2 on the basis of the information by giving higher priority to W2 or by reducing the size of effective area information.

Figure 8:
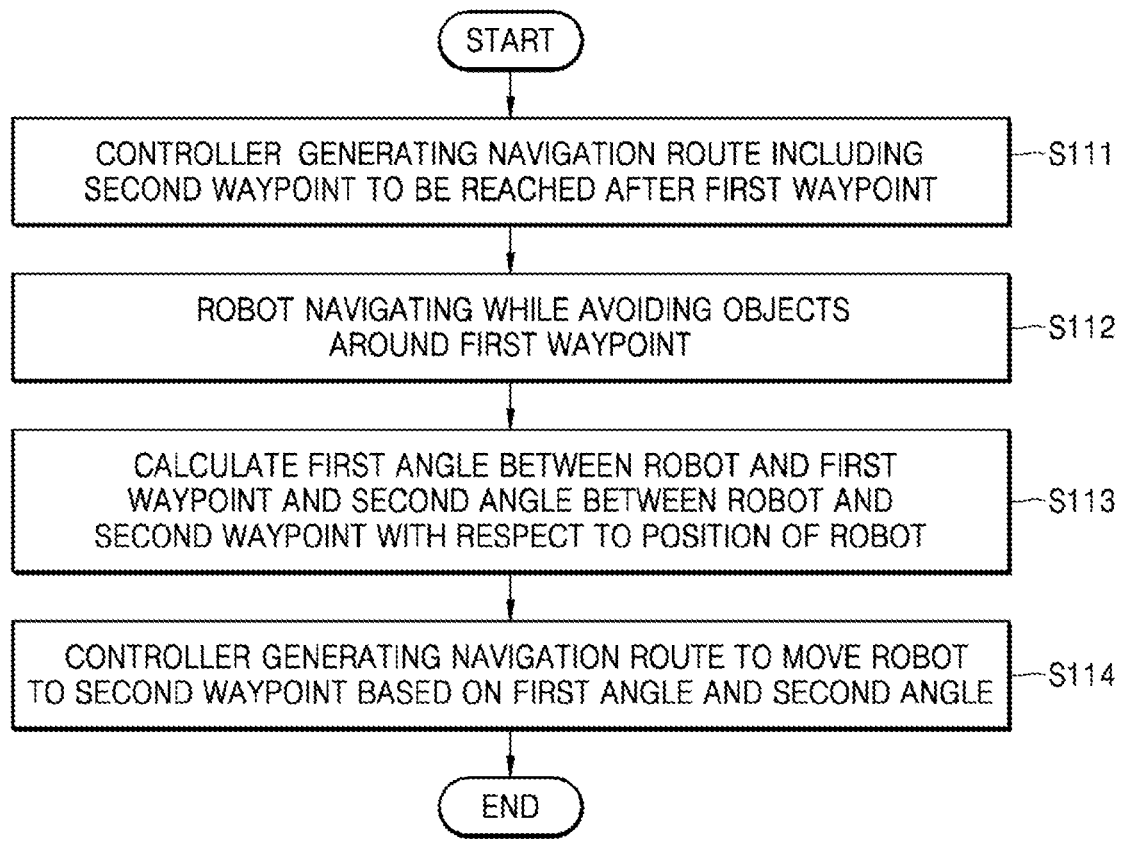
FIGS. 8 and 9 show a process in which a robot according to an embodiment of the present disclosure skips a waypoint on the basis of an angle between the waypoint and the following waypoint.
Figure 9:
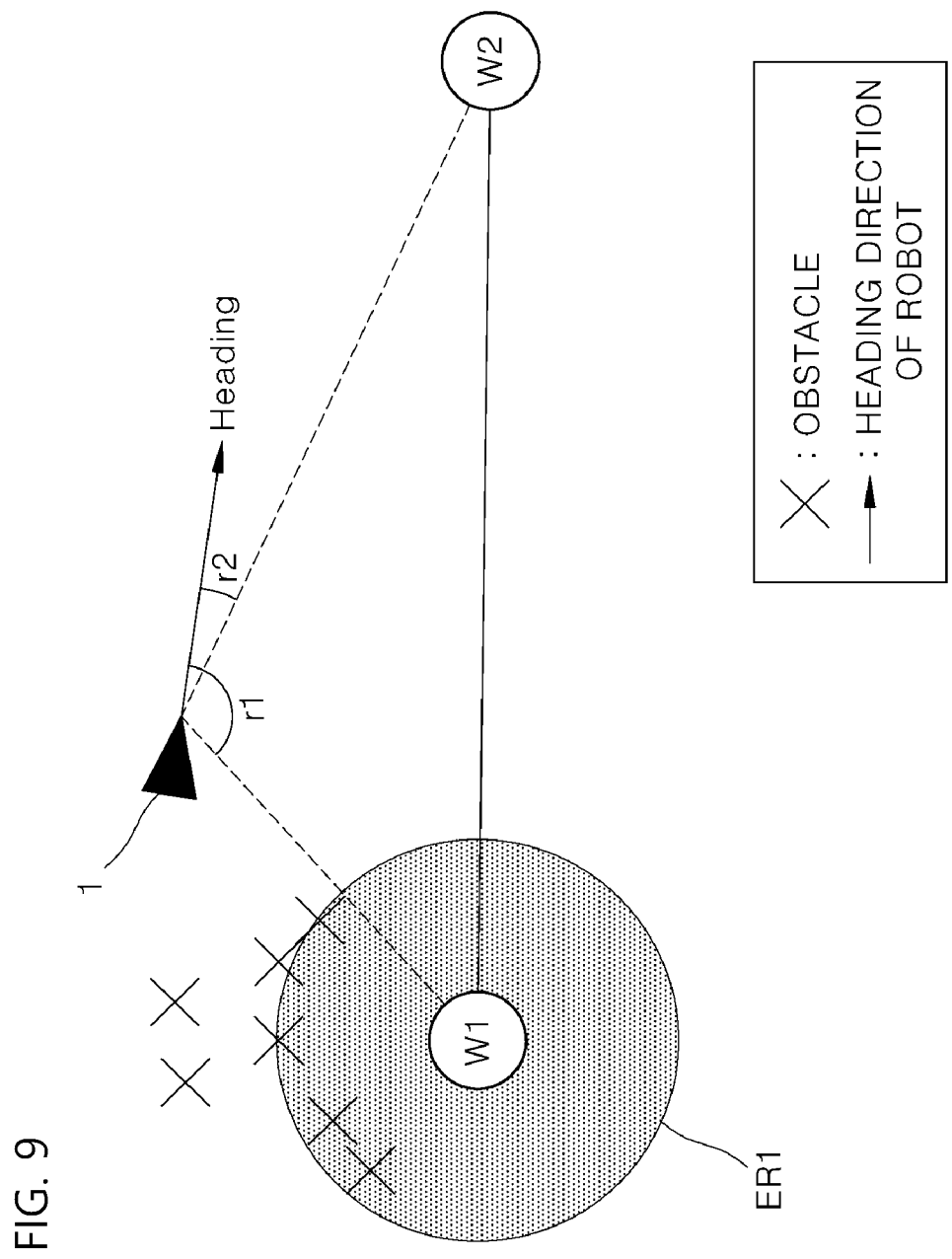

FIGS. 8 and 9 show a process in which a robot according to an embodiment of the present disclosure skips a waypoint on the basis of an angle between the waypoint and the next waypoint.

In FIG. 8, the controller generates a navigation route including a second waypoint that will be reached by the robot after the first waypoint (S111). The robot 1 senses objects, i.e., obstacles around the first waypoint (W1 in FIG. 9) and navigates while avoiding the objects (S112).

While the robot navigates avoiding the objects around the first waypoint (W1 in FIG. 9), the controller 740 calculates a first angle (r1) between the robot 1 and the first waypoint (W1 in FIG. 9) with respect to the position of the robot 1, and a second angle (r2) between the robot and the second waypoint (W2 in FIG. 9) with respect to the position of the robot 1 (S113), and generates a navigation route taken by the robot to the second waypoint on the basis of the calculated r1 and r2 (S114).

In FIG. 9, in the case in which the robot 1 wanders around W1 due to obstacles and then comes close to W2 without reaching an effective area range (ER1) for W1, the robot may move to W2 instead of W1.

To this end, as an exemplary embodiment, the controller 740 calculates a first angle (r1) between a heading direction of the robot 1 and W1, and a second angle (r2) between a heading direction of the robot 1 and W2 (S113). When the calculated r1 is greater than or equal to a pre-determined angle (Pass_radian), and the calculated r2 is less than or equal to a pre-determined angle (Forward_radian), the robot 1 selects W2 as the next destination and moves to W2 even in the state in which the robot 1 may not reach W1.

Even in this case, information on a shortest distance of the robot from W1 or information on the state of non-arrival at W1 may be stored in the storage. Accordingly, when the robot re-navigates to W1 later, priority may be given to W1.

Certainly, the robot may also move to W2 instead of W1 by comparing a distance between W1 and the robot and a distance between W2 and the robot instead of angles. In this case, the robot may also move to W2 by comparing the distance between the robot and W1, the distance between the robot and W2 or by comparing each distance with a preset reference.

For example, while the robot 1 navigates avoiding objects around the first waypoint (S112) after step 111 in FIG. 8, the controller 740 may calculate a first distance between the robot and the first waypoint with respect to the position of the robot, a second distance between the first waypoint and the second waypoint, and a third distance between the robot and the second waypoint with respect to the position of the robot. For example, in FIG. 9, the robot 1 calculates a distance (first distance) to W1 and a distance (second distance) to W2 from the position of the robot (a position coordinate or an index indicating a position on the map held by the robot).

Additionally, the controller 740 may generate a navigation route on the basis of the first distance and the second distance such that the robot may move to the second waypoint. For example, when the first distance is longer than a preset distance, or when the second distance is shorter than a preset distance, it may be more efficient for the robot to move to the second waypoint than to move to the first waypoint. A criterion for determining the first distance may be set on the basis of a distance in effective area information. For example, the first distance may be 1.5 times longer than a distance in effective area information.

Likewise, a criterion for determining the second distance may be set on the basis of a distance in effective area information. For example, the second distance may be three times longer than a distance in effective area information on the second waypoint. The distance may be set differently or identically for each waypoint.

FIGS. 8 and 9 show an embodiment in which a waypoint is changed at a position in which the robot may move more efficiently, and the robot may determine a change in waypoints on the basis of an angle or a distance.

In this process, when the robot 1 does not pass through a waypoint, the robot 1 may store non-arrival information on the waypoint in the storage 730, and at the time of the following navigation, the robot 1 may generate a navigation route to necessarily go through the waypoint which was not reached by the robot.

FIGS. 8 and 9 are described briefly as follows. When the robot comes close to the next waypoint (W2) while moving near the first waypoint to come close to the first waypoint, the robot 1 moves to the second waypoint without approaching to the first waypoint on the basis of priority of the first waypoint or on the basis of a history about waypoints that were reached by the robot in the past and the like.

Figure 10:
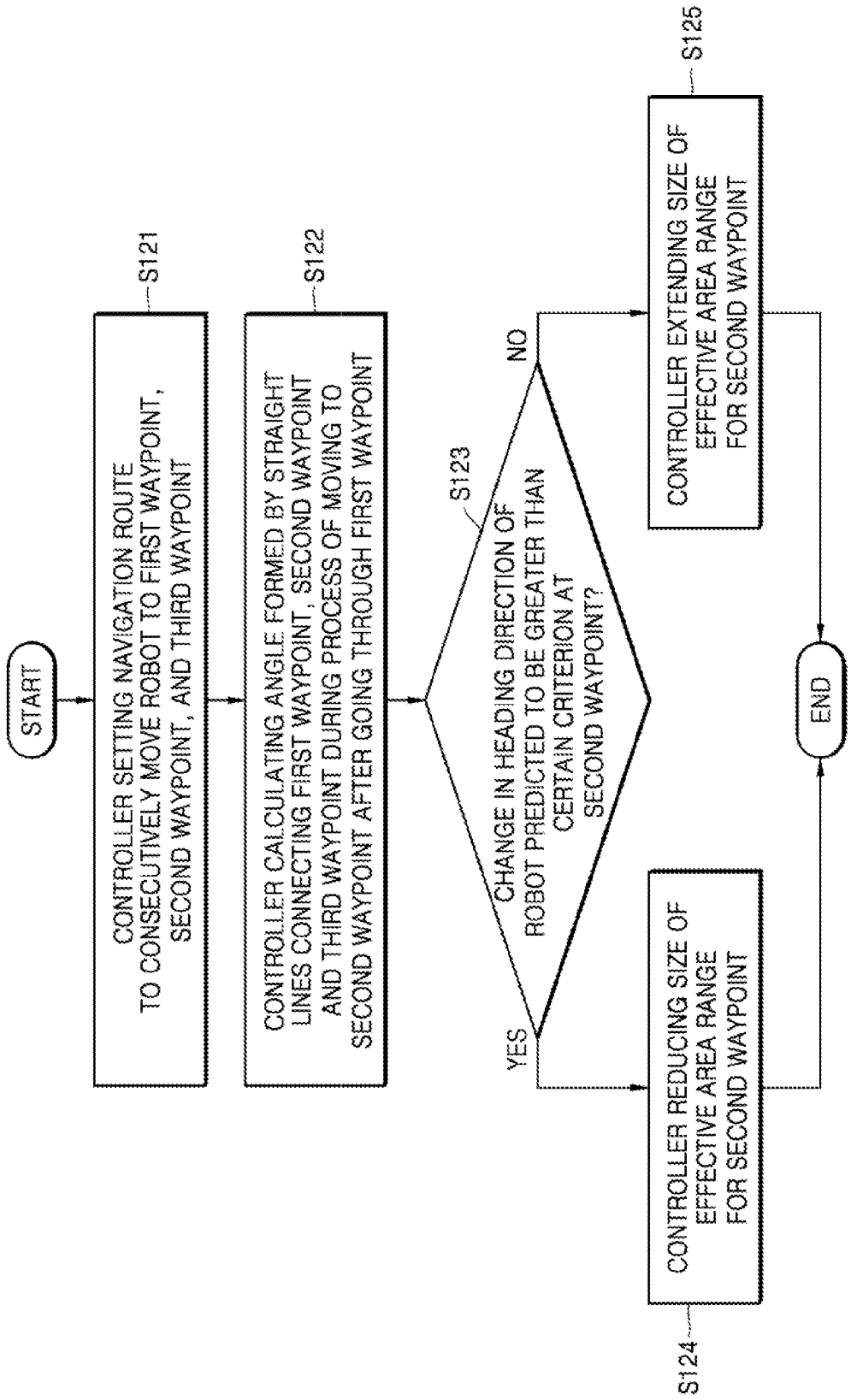
FIGS. 10 and 11 show that an effective area range is adjusted during a navigation path of a robot is set according to an embodiment of the present disclosure.
Figure 11:
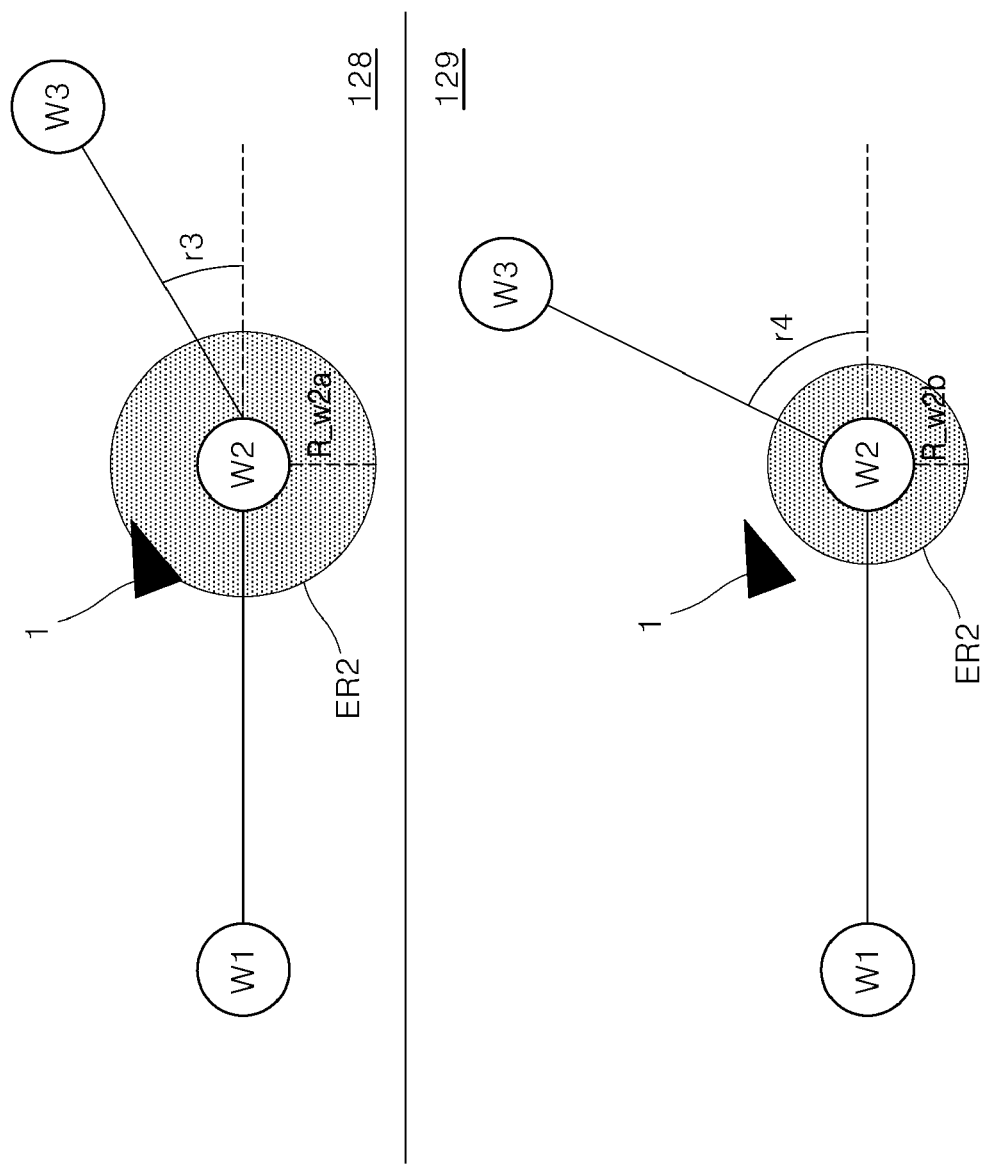

FIGS. 10 and 11 show that an effective area range is adjusted when a navigation path of a robot is set according to an embodiment of the present disclosure.

In FIG. 10, the controller sets a navigation path such that the robot moves to the first waypoint (W1 in FIG. 11), the second waypoint (W2 in FIG. 11), and the third waypoint (W3 in FIG. 11) in the order of the first, the second waypoint, and the third waypoint (S121). Then the controller calculates an angle formed by straight lines that connect the first waypoint, the second waypoint and the third waypoint while the robot 1 is moving to the second waypoint after going through the first waypoint. In Ref No. 128 of FIG. 11, r3 is calculated, and in Ref No. 129 of FIG. 11, r4 is calculated. Additionally, the controller 740 adjusts the size of an effective area range for the second waypoint on the basis of the angles (S123~S125).

As an example, the controller 740 predicts whether a change in the heading direction of the robot is greater than a certain criterion at the second waypoint W2 (S123) to confirm whether W2 is a corner point and to adjust a size of an effective area range. If W2 is a corner point, i.e., in the case in which a change in the heading direction is predicted to be greater than a certain criterion, or in the case in which the above-described angles (r3, r4) formed by the straight lines are respectively greater than a preset angle (e.g., 30 degrees), the controller 740 may determine that W2 is a corner point. A size of the effective area range in the corner point in the embodiment of FIG. 9 may be reduced such that the robot is prevented from moving directly to W3 without going through W2.

By doing so, the robot is prevented from skipping some waypoints by setting a distance range, which is used to determine whether the robot arrives at a waypoint. That is, when an effective area range (R_w2a, and R_w2b in FIG. 11) used to determine that the robot arrives near a waypoint is wide, the robot may smoothly navigate according to changes in the environment where obstacles are disposed. However, when the effective area range is too wide, the robot may navigate along a path far away from a waypoint at which the robot is required to arrive.

Accordingly, the controller 740 recognizes a corner point (129 in FIG. 11) at which a great change in the direction of a path occurs at a waypoint, not to generate the path, and variably applies a boundary of changes in destinations at a corner section.

That is, in FIG. 11, when an angle (r3 and r4) formed by a straight line defined by a previous waypoint (W1) and a current waypoint (W2) and by a straight line defined by the current waypoint (W2) and a next waypoint (W3) is greater than a preset angle, a criterion of an effective area range for W2 is applied as a value (R_w2b) smaller than a regular distance range.

The effective area range (radius of R_w2b) for W2 in Ref No. 129 of FIG. 11, in which a heading direction of the robot is changed at a greater angle at W2, is narrower than the effective area range (radius of R_w2a) for W2 in Ref No. 128 of FIG. 11, in which a direction where the robot is headed is changed at an angle smaller than the angle at W2.

Certainly, an effective area range at the corner point may increase according to a function of a robot. For example, in the case of a cleaning robot, it is important that the robot passes through a corresponding waypoint, so it may be implemented as in FIGS. 10 and 11. Conversely, in the case of a guide robot, it is not necessary that the robot passes through a corresponding waypoint, so it may be implemented as contrary to FIGS. 10 and 11 for smooth navigation. In this case, the controller 740 may also set a size of an effective radius range (R_w2b) of the corner area in FIG. 11 to a size larger than R_w2a.

That is, an effective radius range at the corner point may be decreased as in FIGS. 10 and 11, or conversely, may be increased according to a function of a robot.

However, when a plurality of obstacles are placed or conditions for which the robot arrives at a waypoint are not satisfied although an effective radius range at the corner point is adjusted as in FIGS. 10 and 11, the robot may move to the next waypoint.

That is, when the controller fails to generate a detailed path considering an obstacle while identifying the obstacle by combining various sensors (a LiDAR sensor, a 3D vision sensor, an ultrasonic sensor, an infrared sensor and the like) of the sensor 770 to the next waypoint, the robot may be prevented from staying at a specific waypoint for a long time to avoid the obstacle by forcibly changing a destination to the following waypoint.

Specifically, when the robot approaches to a waypoint without sensing an obstacle placed at the rear side of the robot in a state where in which a large number of obstacles are around the waypoint, a detailed path may be planned such that the robot goes to the rear side of the way point to approach to the waypoint. However, when the obstacles are continuously sensed even after the robot goes to the rear side of the waypoint, the detailed navigation path planned may fail. Accordingly, a limited amount of time spent on attempting to approach to each waypoint may be set. Like effective area information, the time limits may be set for each waypoint differently or identically, or the robot may adjust time limits considering amounts of time accumulated and used by the robot.

Figure 12:
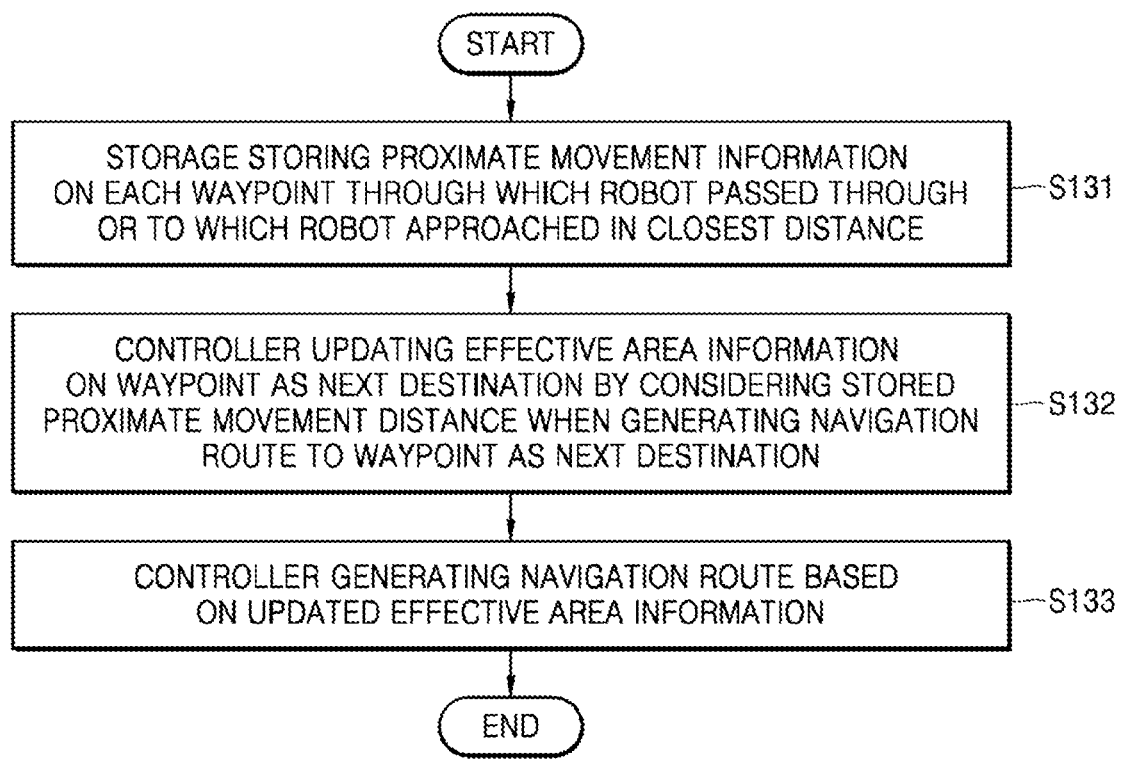
FIG. 12 shows a process of storing a history of movements out of an effective area of a waypoint according to an embodiment of the present disclosure.

FIG. 12 shows a process of storing a history of movements out of an effective area of a waypoint according to an embodiment of the present disclosure.

The storage stores proximate movement information on each waypoint through which the robot passes or on each waypoint to which the robot makes its closest approach (S131). The proximate movement information may be stored each time the robot passes through a waypoint. The proximate movement information may be described as follows.

TABLE 2

| IDENTIFICATION INFORMATION | PROXIMATE MOVEMENT INFORMATION | EFFECTIVE AREA INFORMATION |
| --- | --- | --- |
| W1 | 0 | 1 |
| W2 | 7 | 5 |
| W3 | 2 | 2 |
| W4 | 1 | 7 |
| W5 | 4 | 3 |

The proximate movement information indicates a distance that is between the robot and a corresponding waypoint when the robot makes its closest approach to the waypoint. At W1, "0" indicates that the robot accurately arrives at a waypoint. At W2, the proximate movement information indicates "7" while a distance in the effective area information indicates "5". This means that the robot didn't arrive at the waypoint. Proximate movement information for each waypoint may be stored as described above.

Additionally, the controller 740 updates the effective area information on a waypoint, which is the following destination, by taking into account the stored proximate movement distance when generating a navigation route to the waypoint as the next destination (S132).

For example, when the robot re-generates a navigation route after passing through W1-W2-W3-W4-W5, the effective area information at W1 may be increased to "2" because the robot accurately passed through W1 during the previous navigation process.

Likewise, the effective area information at W2 may be decreased to "4" because the robot did not accurately pass through W2 during the previous navigation process.

The effective area information may be adjusted as in Table 3 on the basis of a degree at which the robot approached to a waypoint in the past. When the effective area information indicates distance "7", and when the effective area information may not be increased any longer, at W4, the waypoint is meaningless. Accordingly, the waypoint remains the same. Additionally, the robot may update proximate movement information again on the basis of the effective area information updated as in Table 3 while the robot is moving. In FIG. 3, proximate movement information is not set because the robot renew its navigation. Table 2 and Table 3 may be updated during every navigation process, and the proximate movement information may be reset to values of the effective area information set as in Table 1.

TABLE 3

| IDENTIFICATION INFORMATION | PROXIMATE MOVEMENT INFORMATION | EFFECTIVE AREA INFORMATION |
|---|---|---|
| W1 | | 2 |
| W2 | | 4 |
| W3 | | 2 |
| W4 | | 7 |
| W5 | | 2.5 |

The controller 740 generates a navigation route on the basis of the effective area information updated as in Table 3 (S133), and navigates along the navigation route.

According to the above-described embodiments, navigation of the robot may be controlled on the basis of a plurality of waypoints. Further, the robot may smoothly move using effective area information depending on situations when determining the arrival of the robot at each waypoint.

Additionally, the robot is prevented from spending much time around a waypoint with a large number of obstacles by varying criteria for determining whether the robot arrives at each waypoint on the basis of a situation in which obstacles are placed, a distance between the robot and the next waypoint and the like, or by setting various criteria such that the robot skips the waypoint and moves to the next waypoint.

Specifically, the robot required to pass through various waypoints may efficiently move by varying criteria for determining the arrival of the robot at a waypoint on the basis of a relationship between waypoints (a distance between waypoints, or the shape of an angle between waypoints and the like), or by setting various criteria such that the robot may pass through a corresponding waypoint and moves to the next waypoint.

According to the embodiments presented in this specification, the robot may smoothly navigate and proceed between preset waypoints in an environment that is crowded with a large number of pedestrians. Further, the robot may be prevented from continuously wandering around people standing near the robot to necessarily enter a waypoint, which is not a destination.

Further, the robot may navigate to a waypoint through which the robot necessarily passes when necessary despite obstacles. This process may be implemented on the basis of effective area information set for each waypoint and on the basis of a history of the previous navigation.

When all elements of the embodiments of the disclosure are described to be combined into one element or to operate in combination, the disclosure is not limited to the embodiments and all the elements may be selectively combined to operate within the scope of the disclosure. All the elements may be embodied can be embodied as independent hardware pieces, respectively, or some or all of the elements may be selectively combined and may be embodied as a computer program including a program module that performs some or all functions combined into one or more hardware pieces. Codes or code segments of the computer program can be easily inferred by those skilled in the art. The computer program can be stored in a computer-readable recording medium and can be read and executed by a computer, whereby the embodiments of the disclosure can be realized. Examples of a storage medium having stored the computer program include storage mediums such as a magnetic recording medium, an optical recording medium, and a semiconductor recording medium. The computer program for realizing the embodiments of the disclosure includes a program module which is transmitted via an external device in real time.

While embodiments of the disclosure have been described above, various changes or modifications can be made thereon by those skilled in the art. Accordingly, it should be understood that such changes and modifications belong to the scope of the disclosure without departing from the scope of the disclosure.

DESCRIPTION OF THE SYMBOLS

1: ROBOT
730: STORAGE
740: CONTROLLER
770: SENSOR

The invention claimed is:

1. A robot comprising:
a storage configured to store position information on a first destination waypoint, information on priority of each destination waypoint, effective area information of each destination waypoint, and time limit to each destination waypoint, wherein the time limit corresponds to an amount of time spent attempting to approach each waypoint by the robot;
a sensor configured to sense objects, wherein the objects are located in a direction towards which the robot moves or located around the first destination waypoint to be reached by the robot; and
a controller configured to:
generate a navigation route based on the stored effective area information of each destination waypoint, the stored information on priority of each destination waypoint, and a history of each destination waypoint that was previously reached by the robot such that the robot moves to the first destination waypoint based on the stored position information on the first destination waypoint and on the sensed objects, wherein the navigation route further includes the first destination waypoint, a second destination waypoint to be reached by the robot after the first destination waypoint, and a third destination waypoint to be reached by the robot after the second destination waypoint;
determine an angle formed by a first line and a second line while the robot is moving to the second destination waypoint after reaching the first destination waypoint, wherein the first line is defined by connecting the first destination waypoint and the second destination waypoint and the second line is defined by connecting the second destination waypoint and the third destination waypoint;

predict whether a change in a heading direction of the robot is greater than a certain criterion at the second waypoint using the determined angle, and reduce a size of an effective area range of the second waypoint based on a determination that the second waypoint is a corner point.

2. The robot of claim 1, wherein
the controller is further configured to move the robot to the second destination waypoint by updating the navigation route when a distance between a current position of the robot and a coordinate of the first destination waypoint is within a preset reference distance and when the robot cannot reach the first destination waypoint due to the objects being located near the first destination waypoint.

3. The robot of claim 1, wherein
the controller is further configured to move the robot to the second destination waypoint by updating the navigation route based on a first angle and a second angle while the robot navigates to avoid the objects around the first destination waypoint, wherein the first angle is defined between a current heading direction of the robot and a first heading direction toward the first destination waypoint with respect to a position of the robot and the second angle is defined between the current heading direction of the robot and a second heading direction towards the second destination waypoint with respect to the position of the robot.

4. The robot of claim 1, wherein
the controller is further configured to:
adjust a size of an area range for the second destination waypoint based on the determined angle formed by the first line and the second line while the robot is moving to the second destination waypoint after reaching the first destination waypoint.

5. The robot of claim 1, wherein
the controller is further configured to:
determine a first distance and a second distance while the robot navigates to avoid the objects around the first destination waypoint, wherein the first distance is defined between a current position of the robot and the first destination waypoint and the second distance is defined between the current position of the robot and the second destination waypoint, and move the robot to the second destination waypoint by updating the navigation route based on comparing the determined first distance and the determined second distance or comparing the determined first distance and the determined second distance with a preset distance.

6. The robot of claim 1, wherein the navigation route is generated based on an area range information correlated with the first destination waypoint, wherein the area range information is stored in the storage and corresponds to a criterion for determining whether the robot reached the first destination waypoint.

7. The robot of claim 6, wherein the area range information correlated with the first destination waypoint is updated based on proximate movement information stored in the storage when generating the navigation route to the first destination waypoint, wherein the proximate movement information comprises destination waypoints that the robot reached or a minimum distance reached by the robot for the destination waypoints.

8. A method, the method comprising:
storing, in a storage, position information on a first destination waypoint, information on priority of each destination waypoint, effective area information of each destination waypoint, and time limit to each destination waypoint, wherein the time limit corresponds to an amount of time spent attempting to approach each waypoint by a robot;

sensing objects, wherein the objects are located in a direction towards which a robot moves or located around a first destination waypoint to be reached by the robot;

generating a navigation route based on the stored effective area information of each destination waypoint, the stored information on priority of each destination waypoint, and a history of each destination waypoint that was previously reached by the robot such that the robot moves to the first destination waypoint based on the stored position information on the first destination waypoint and on the sensed objects, wherein the navigation route includes the first destination waypoint, a second destination waypoint to be reached by the robot after the first destination waypoint, and a third destination waypoint to be reached by the robot after the second destination waypoint;

moving the robot based on the generated navigation route;

determining an angle formed by a first line and a second line while the robot is moving to the second destination waypoint after reaching the first destination waypoint, wherein the first line is defined by connecting the first destination waypoint and the second destination waypoint and the second line is defined by connecting the second destination waypoint and the third destination waypoint;

predicting whether a change in a heading direction of the robot is greater than a certain criterion at the second waypoint using the determined angle; and reducing a size of an effective area range of the second waypoint based on a determination that the second waypoint is a corner point.

9. The method of claim 8, the method further comprising:
sensing the objects around the first destination waypoint; and moving the robot to the second destination waypoint by updating the navigation route when a distance between a current position of the robot and a coordinate of the first destination waypoint is within a preset reference distance and when the robot cannot reach the first destination waypoint due to the objects being located near the first destination waypoint.

10. The method of claim 8, the method further comprising:
navigating to avoid the objects around the first destination waypoint;

determining a first angle and a second angle, wherein the first angle is defined between a current heading direction of the robot and a first heading direction towards the first destination waypoint with respect to a position of the robot, and the second angle is defined between the current heading direction of the robot and a second heading direction towards the second destination waypoint with respect to the position of the robot; and moving the robot to the second waypoint by updating the navigation route based on the first angle and the second angle.

11. The method of claim 8, the method further comprising:
adjusting a size of an area range for the second destination waypoint based on the determined angle formed by the first line and the second line while the robot is moving to the second destination waypoint after reaching the first destination waypoint.

12. The method of claim 8, the method further comprising:
    determining a first distance and a second distance while the robot navigates to avoid the objects around the first destination waypoint, wherein the first distance is defined between a current position of the robot and the first destination waypoint and the second distance is defined between the current position of the robot and the second destination waypoint; and
    moving the robot to the second destination waypoint by updating the navigation route based on comparing the determined first distance and the determined second distance or comparing the determined first distance and the determined second distance with a preset distance.

13. The method of claim 8, wherein the navigation route is generated based on an area range information correlated with the first destination waypoint, wherein the area range information is stored in the storage and corresponds to a criterion for determining whether the robot reached the first destination waypoint.

14. The method of claim 13, wherein the area range information correlated with the first destination waypoint is updated based on proximate movement information stored in the storage when generating the navigation route to the first destination waypoint, wherein the proximate movement information comprises destination waypoints that the robot reached or a minimum distance reached by the robot for the destination waypoints.

15. A machine-readable non-transitory medium having stored thereon machine-executable instructions for:
    storing, in a storage, position information on a first destination waypoint, information on priority of each destination waypoint, effective area information of each destination waypoint, and time limit to each destination waypoint, wherein the time limit corresponds to an amount of time spent attempting to approach each waypoint by a robot;
    sensing objects, wherein the objects are located in a direction toward which a robot moves or located around the first destination waypoint to be reached by the robot;
    generating a navigation route based on the stored effective area information of each destination waypoint, the stored information on priority of each destination waypoint, and a history of each destination waypoint that was previously reached by the robot such that the robot moves to the first destination waypoint based on the stored position information on the first destination waypoint and the sensed objects, wherein the navigation route includes the first destination waypoint, a second destination waypoint to be reached by the robot after the first destination waypoint, and a third destination waypoint to be reached by the robot after the second destination waypoint;
    determining an angle formed by a first line and a second line while the robot is moving to the second destination waypoint after reaching the first destination waypoint, wherein the first line is defined by connecting the first destination waypoint and the second destination waypoint and the second line is defined by connecting the second destination waypoint and the third destination waypoint;
    predicting whether a change in a heading direction of the robot is greater than a certain criterion at the second waypoint using the determined angle, and
    reducing a size of an effective area range of the second waypoint based on a determination that the second waypoint is a corner point.

16. The machine-readable non-transitory medium of claim 15, further having stored thereon machine-executable instructions for:
    moving the robot to the second destination waypoint by updating the navigation route when a distance between a current position of the robot and a coordinate of the first destination waypoint is within a preset reference distance and when the robot cannot reach the first destination waypoint due to the objects being located near the first destination waypoint.

17. The machine-readable non-transitory medium of claim 15, further having stored thereon machine-executable instructions for:
    determining a first angle and a second angle, wherein the first angle is defined between a current heading direction of the robot and a first heading direction towards the first destination waypoint with respect to a position of the robot and the second angle is defined between the current heading direction of the robot and a second heading direction towards the second destination waypoint with respect to the position of the robot; and
    moving the robot to the second destination waypoint by updating the navigation route based on the first angle and the second angle.

18. The machine-readable non-transitory medium of claim 15, further having stored thereon machine-executable instructions for:
    adjusting a size of an area range for the second destination waypoint based on the determined angle formed by the first line and the second line while the robot is moving to the second destination waypoint after reaching the first destination waypoint.

19. The machine-readable non-transitory medium of claim 15, further having stored thereon machine-executable instructions for:
    determining a first distance and a second distance while the robot navigates to avoid the objects around the first destination waypoint, wherein the first distance is defined between a current position of the robot and the first destination waypoint and the second distance is defined between the current position of the robot and the second destination waypoint, and
    moving the robot to the second destination waypoint by updating the navigation route based on comparing the determined first distance and the determined second distance or comparing the determined first distance and the determined second distance with a preset distance.

20. The machine-readable non-transitory medium of claim 15, wherein the navigation route is generated based on an area range information correlated with the first destination waypoint, wherein the area range information is stored in the storage and corresponds to a criterion for determining whether the robot reached the first destination waypoint.

* * * * *